United States Patent
Naguib et al.

(10) Patent No.: US 7,012,912 B2
(45) Date of Patent: Mar. 14, 2006

(54) POWER CONTROL AND SCHEDULING IN AN OFDM SYSTEM

(75) Inventors: Ayman Fawzy Naguib, Cupertino, CA (US); Avneesh Agrawal, San Diego, CA (US); Arak Sutivong, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/809,605

(22) Filed: Mar. 24, 2004

(65) Prior Publication Data

US 2004/0228283 A1    Nov. 18, 2004

Related U.S. Application Data

(60) Provisional application No. 60/470,727, filed on May 14, 2003.

(51) Int. Cl.
*H04J 1/00* (2006.01)

(52) U.S. Cl. ............... 370/343; 370/252; 455/450

(58) Field of Classification Search ........... 370/203, 370/208, 210, 252; 455/69, 450; 375/260, 375/285
See application file for complete search history.

(56) References Cited

U.S. PATENT DOCUMENTS

| | | | | |
|---|---|---|---|---|
| 5,726,978 A | * | 3/1998 | Frodigh et al. | 370/252 |
| 5,956,642 A | * | 9/1999 | Larsson et al. | 455/449 |
| 5,973,642 A | * | 10/1999 | Li et al. | 342/378 |
| 5,991,273 A | * | 11/1999 | Abu-Dayya | 370/252 |
| 6,005,876 A | * | 12/1999 | Cimini, Jr. et al. | 370/525 |
| 6,052,594 A | * | 4/2000 | Chuang et al. | 455/450 |
| 6,064,692 A | * | 5/2000 | Chow | 375/219 |
| 6,131,016 A | * | 10/2000 | Greenstein et al. | 455/69 |
| 6,751,444 B1 | * | 10/2000 | Greenstein et al. | 455/69 |
| 6,563,885 B1 | * | 5/2003 | Magee et al. | 375/316 |
| 6,570,444 B1 | * | 5/2003 | Wright | 330/149 |
| 2002/0089923 A1 | * | 7/2002 | Yoshida et al. | 370/208 |
| 2004/0208139 A1 | * | 10/2004 | Iwamura | 370/321 |

FOREIGN PATENT DOCUMENTS

JP          2003060606 A   *   2/2003

* cited by examiner

*Primary Examiner*—Steven Nguyen
*Assistant Examiner*—Clemence Han
(74) *Attorney, Agent, or Firm*—Dmitry R. Milikovsky; Sandip S. (Micky) Minhas; Philip Wadsworth (57) ABSTRACT

A system and method for power control and scheduling of sub-carriers in an OFDM communication system. The receiver dynamic range can be minimized by a power control loop that attempts to maintain received power over a noise floor in a predetermined range. If the received power relative to a noise floor in allocated sub-carriers exceeds the predetermined range and the total received power is at the minimum, the scheduling system allocates an additional sub-carrier to the communication link. Additionally, if the received power relative to the noise floor is less than the predetermined range minimum, and the total received power is at a maximum, the scheduling system de-allocates a sub-carrier from the communication link. The scheduling system may also adjust an encoding rate to maintain a relatively constant symbol rate in each sub-carrier.

37 Claims, 8 Drawing Sheets

POWER CONTROL AND SCHEDULING IN AN OFDM SYSTEM

CLAIM OF PRIORITY UNDER 35 U.S.C. §119

The present Application for Patent claims priority to Provisional Application No. 60/470,727 entitled "Power Control and Scheduling in an OFDM System" filed May 14, 2003, and assigned to the assignee hereof and hereby expressly incorporated by reference herein.

BACKGROUND OF THE INVENTION

1. Field of the Invention

The invention relates to the field of wireless communications. More particularly, the invention relates to systems and methods for transmit power control and sub-carrier allocation in an Orthogonal Frequency Division Multiplexing (OFDM) system.

2. Description of the Related Art

Wireless communication systems are continually relied upon to transmit enormous amounts of data in a variety of operating conditions. The amount of frequency spectrum, or bandwidth, that is allocated to a communication system is often limited by government regulations. Thus, there is a constant need to optimize data throughput in a given communication bandwidth.

The problem of optimizing data throughput in a given communication band is compounded by the need to simultaneously support multiple users. The users may each have different communication needs. One user may be transmitting low rate signals, such as voice signals, while another user may be transmitting high rate data signals, such as video. A communication system can implement a particular method of efficiently utilizing a communication band to support multiple users.

Wireless communication systems can be implemented in many different ways. For example, Frequency Division Multiple Access (FDMA), Time Division Multiple Access (TDMA), Code Division Multiple Access (CDMA), and Orthogonal Frequency Division Multiplexing (OFDM) are used in wireless communication systems. Each of the different communication systems has advantages and disadvantages related to particular system aspects.

Figure 1:
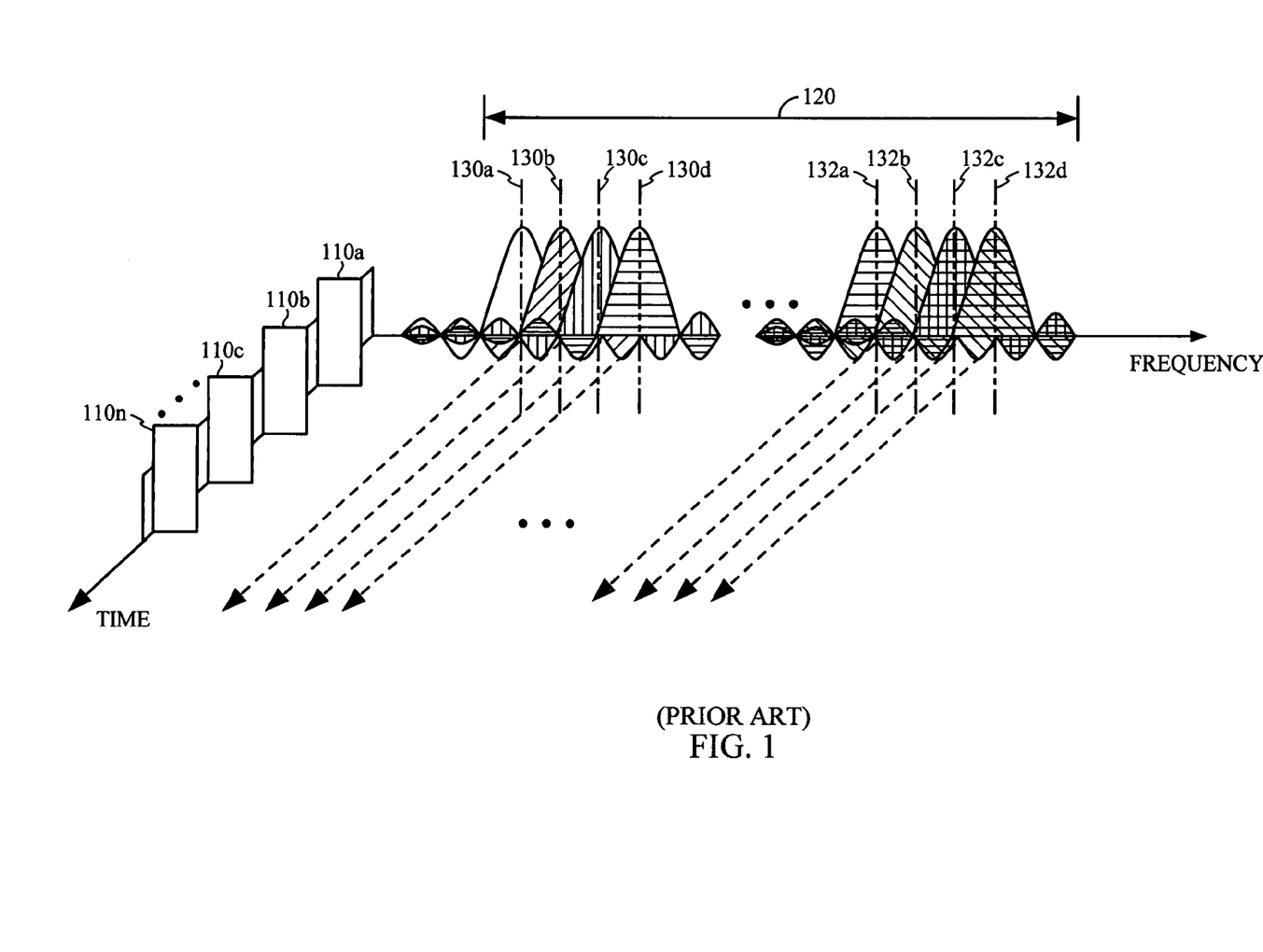
FIG. 1 is a functional frequency-time representation of a typical OFDM system.

FIG. 1 is a frequency-time representation of signals in a typical OFDM system. The OFDM system has an allocated frequency spectrum 120. The allocated frequency spectrum 120 is divided into multiple carriers, for example 130a–130d and 132a–132d. The multiple carriers in an OFDM system may also be referred to as sub-carriers. Each of the sub-carriers, for example 130a, is modulated with a low rate data stream. Additionally, as the system name implies, each of the sub-carriers, for example 130a, is orthogonal to all of the other sub-carriers, for example 130b–130d and 132a–132d.

The sub-carriers, for example 130a–130d, can be constructed to be orthogonal to one another by gating the sub-carrier on and off. A sub-carrier, for example 130a, gated on and off using a rectangular window produces a frequency spectrum having a (sin (x))/x shape. The rectangular gating period and the frequency spacing of the sub-carriers, for example 130a and 130b, can be chosen such that the spectrum of the modulated first sub-carrier 130a is nulled at the center frequencies of the other sub-carriers, for example 130b–130d.

The OFDM system can be configured to support multiple users by allocating a portion of the sub-carriers to each user. For example, a first user may be allocated a first set of sub-carriers 130a–130d and a second user may be allocated a second set of sub-carriers 132a–132d. The number of sub-carriers allocated to users need not be the same and the sub-carriers do not need to be in a contiguous band.

Thus, in the time domain, a number of OFDM symbols 110a–110n are transmitted, resulting in a frequency spectrum of orthogonal sub-carriers 130a–130d and 132a–132d. Each of the sub-carriers, for example 130a, is independently modulated. One or more sub-carriers 130a–130d may be allocated to an individual communication link. Additionally, the number of sub-carriers assigned to a particular user may change over time.

Thus, OFDM is a promising multiplexing technique for high data rate transmission over wireless channels that can be implemented in wireless communication systems, such as cellular communication systems supporting large numbers of users. However, cellular systems use a frequency reuse concept to enhance the efficiency of spectral utilization. Frequency reuse introduces co-channel interference (CCI), which is a major source of performance degradation in such systems. As discussed above, all users within the same cell or sector of an OFDM system are orthogonal to each other because all of the sub-carriers are orthogonal. Thus, within the same cell or sector, the multiple sub-carriers cause substantially no interference to each other. However, adjacent cells or sectors may use the same frequency space because of frequency reuse. Hence, in an OFDM system, users in different cells or sectors are sources of interference and produce the main source of CCI for adjacent cells or sectors.

The receiver may operate in a closed power control loop with a transmitter. The transmitter typically adjusts the power level transmitted on each sub-carrier in order to maintain the signal to interference plus noise ratio (SNIR) required for a certain Quality of Service (QOS) or performance level.

It is desirable to maintain the transmit power in each sub-carrier within a predefined window in order to minimize the dynamic range required of a receiver. Additionally, it is desirable to minimize the amount of CCI by minimizing the amount of interference generated by a particular transmitter.

SUMMARY OF THE INVENTION

A method and apparatus for scheduling sub-carriers in an OFDM system are disclosed. In one aspect, the invention is a method of scheduling sub-carriers in an OFDM system. The method includes determining a signal to noise ratio for allocated sub-carriers in an OFDM communication link and adjusting a number of allocated sub-carriers based, at least in part, on the signal to noise ratio. In another aspect, the method includes receiving at a base station a wirelessly transmitted OFDM signal from a terminal, determining a signal to noise level for allocated sub-carriers in the OFDM signal, determining if the signal to noise ratio is within a predetermined range, and scheduling a number of sub-carriers for a communication link from the terminal to the base station based, at least in part, on whether the signal to noise is within the predetermined range.

In still another aspect, the invention is an apparatus for scheduling sub-carriers in an OFDM system. The apparatus includes a noise estimator configured to estimate a noise level in a sub-carrier frequency band, a signal to noise ratio determination module coupled to the noise estimator and configured to determine a signal to noise ratio in the sub-carrier frequency band, and a sub-carrier scheduler coupled to the signal to noise ratio determination module and configured to schedule a number of sub-carriers based, at least in part, on whether the signal to noise is within a predetermined range.

In still another aspect, the invention is a method of scheduling sub-carriers in an OFDM system, including receiving a sub-carrier allocation, modifying a coding rate for data provided to an allocated sub-carrier based, at least in part, on a number of sub-carriers in the sub-carrier allocation, and generating an OFDM signal using the number of sub-carriers in the sub-carrier allocation.

BRIEF DESCRIPTION OF THE DRAWINGS

The above-described aspects and other aspects, features and advantages of the invention will be apparent upon review of the following detailed description and the accompanying drawings. In the drawings, like reference characters identify identical or functionally equivalent elements.

DETAILED DESCRIPTION OF THE PREFERRED EMBODIMENT

It is advantageous to power control different users in an OFDM system such that the ratio of signal over the noise in the signal bandwidth is the same for all users. In an OFDM system, it is advantageous to maintain the same ratio of signal to noise in each sub-carrier frequency band for all users. Maintaining an equal sub-carrier signal to noise helps to minimize inter-carrier interference. Maintaining equal sub-carrier signal to noise ratios also reduces the dynamic range of the receiver. Reducing the dynamic range of the receiver eases the requirements on the power amplifiers used in the receiver, potentially reducing the cost of the receiver. The OFDM transmit power spectral density for all users can be maintained within a predefined range by determining the signal to noise ratio in each sub-carrier frequency band and adjusting the number of sub-carriers allocated to the communication link based in part on the signal to noise ratios.

Figure 2:
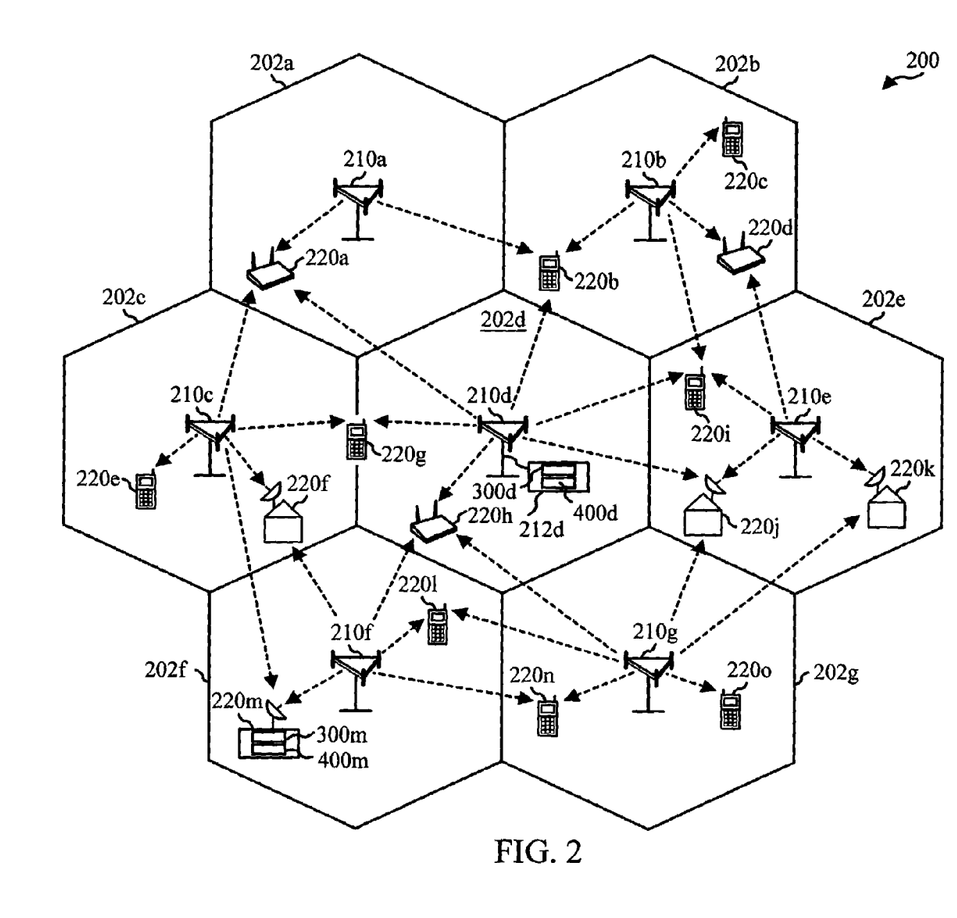
FIG. 2 is a functional block diagram of an OFDM system implemented in a cellular environment.

A functional block diagram of a cellular OFDM wireless communication system 200 having receivers that incorporate sub-carrier noise and interference detection is shown in FIG. 2. The OFDM system 200 includes a number of base stations 210a–210g that provide communication for a number of terminals 220a–220o. A base station, for example 210a, can be a fixed station used for communicating with the terminals, for example 220a, and may also be referred to as an access point, a Node B, or some other terminology.

Various terminals 220a–220o may be dispersed throughout the OFDM system 200, and each terminal may be fixed, for example 220k, or mobile, for example 220b. A terminal, for example 220a may also be referred to as a mobile station, a remote station, a user equipment (UE), an access terminal, or some other terminology. Each terminal, for example 220a, may communicate with one or possibly multiple base stations on the downlink and/or uplink at any given moment. Each terminal, for example 220m, may include an OFDM transmitter 300m and an OFDM receiver 400m to enable communications with the one or more base stations. Embodiments of the OFDM transmitter 300m and the OFDM receiver 400m are described in further detail in FIGS. 3 and 4. In FIG. 2, terminals 220a through 220o can receive, for example pilot, signaling, and user-specific data transmissions from base stations 210a through 210g.

Each base station, for example 210a, in the OFDM system 200 provides coverage for a particular geographic area, for example 202a. The coverage area of each base station is typically dependent on various factors (e.g., terrain, obstructions, and so on) but, for simplicity, is often represented by an ideal hexagon as shown in FIG. 2. A base station and/or its coverage area are also often referred to as a "cell", depending on the context in which the term is used.

To increase capacity, the coverage area of each base station, for example 210a, may be partitioned into multiple sectors. If each cell is partitioned into three sectors, then each sector of a sectorized cell is often represented by an ideal 120° wedge that represents one third of the cell. Each sector may be served by a corresponding base transceiver subsystem (BTS), for example 212d. The BTS 212d includes an OFDM transmitter 300d and an OFDM receiver 400d, each of which are described in greater detail in FIGS. 3 and 4. For a sectorized cell, the base station for that cell often includes all of the BTSs that serve the sectors of that cell. The term "sector" is also often used to refer to a BTS and/or its coverage area, depending on the context in which the term is used.

As will be discussed in further detail below, each base station, for example 210a, typically implements a transmitter configured to provide the downlink, also referred to as the forward link, communication to terminals, for example 220a. Additionally, each base station, for example 210a, also implements a receiver configured to receive the uplink, also referred to as reverse link, communication from the terminals, for example 220a.

In the downlink direction, the base station transmitter receives a signal from a signal source, which may be a Public Switched Telephone Network (PSTN) or some other signal source. The base station transmitter then converts the signal to an OFDM signal that is to be transmitted to one or more terminals. The base station transmitter may digitize the signal, multiplex the signal into several parallel signals, and modulate a predetermined number of sub-carriers corresponding to the number of parallel signal paths. The number of sub-carriers may be constant or may change. Additionally, the sub-carriers may be adjacent to one another so as to define a contiguous frequency band or may be disjoint from one another so as to occupy a number of independent frequency bands. The base station may assign sub-carriers in a method that is constant, such as in the case of a fixed number of sub-carriers, pseudo-random, or random. The base station transmitter may also include an analog or Radio Frequency (RF) portion to convert OFDM baseband signals to a desired transmit frequency band.

In an OFDM system 200, frequency reuse may occur in every cell. That is, the up link an down link frequencies used by a first base station, for example 210d, in a first cell, for example 202d, may be used by the base stations, 210a–c and 210e–g, in adjacent cells 202a–c and 202e–g. As described above, each base station transmitter contributes to the co-channel interference (CCI) experienced by neighboring receivers, in this case neighboring terminal receivers. For example, the transmitter in a first base station 210f contributes to the CCI of terminals, 220e and 220g, in adjacent cells 202c and 202d, that are not communicating with the first base station 210f. To help minimize the amount of CCI experienced by neighboring terminals, the base station transmitter can be part of a closed loop power control system.

To help minimize the amount of CCI experienced by terminals outside of a cell, for example 202f, the base station transmitter may minimize the RF power it transmits to each of the terminals, 220m and 220l, with which the base station 210f is in communication. The base station transmitter can adjust the transmit power based in part on a determination of the noise level in each sub-carrier band and on a power control signal transmitted by the terminal and received by a base station receiver.

The base station, for example 210b, can attempt to maintain a predetermined SINR or C/I value for each sub-carrier, such that a predetermined quality of service is maintained to the terminals, for example 220b–d. An SINR or C/I that is greater than the predetermined value may contribute little to the quality of service seen by the terminal, for example 220b, but would result in an increased CCI for all adjacent cells, 202a, 202d and 202e. Conversely, an SINR or C/I value that is below the predetermined level can result in greatly decreased quality of service experienced by the terminal, 220b.

The base station receiver can measure the noise and interference levels in each of the sub-carrier bands as part of a power control loop that sets a SINR or C/I of the transmit signal. The base station receiver measures the noise and interference levels in each of the sub-carrier bands and stores the levels. As sub-carriers are assigned to communication links, the base station transmitter examines the noise and interference levels in determining the power to allocate to each sub-carrier. Thus, the base station transmitter can maintain a predetermined SINR or C/I for each sub-carrier that minimizes the CCI experienced by terminals in other cells.

In another embodiment, the terminal, for example 220i, can attempt to maintain the minimum received SINR or C/I required for achieving a predetermined quality of service. When the received SINR or C/I is above a predetermined level, the terminal 220i can transmit a signal to the base station 210f to request the base station 210f reduce the transmit signal power. Alternatively, if the received SINR or C/I is below the predetermined level, the terminal 220i can transmit a signal to the base station 210f to request that the base station 210f increase the transmit signal power. Thus, by minimizing the power transmitted to any given terminal, the amount of CCI experienced by terminals in adjacent cells is minimized.

Figure 3:
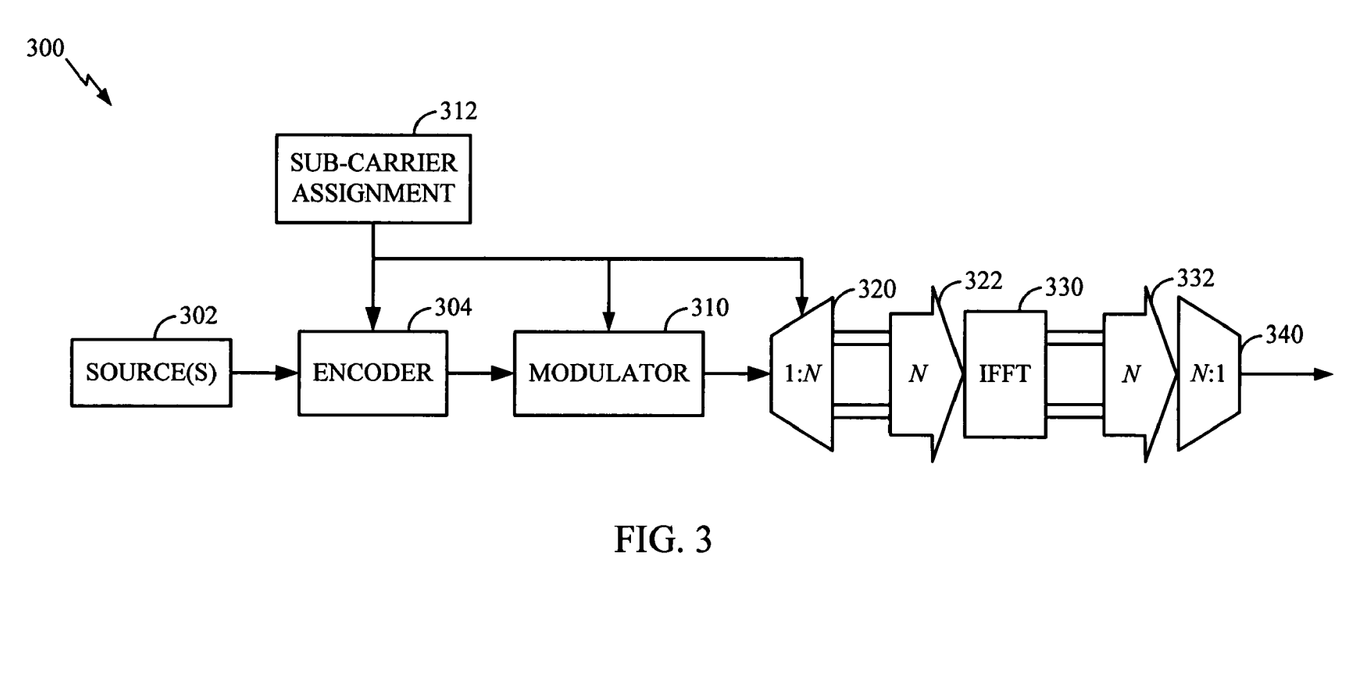
FIG. 3 is a functional block diagram of an OFDM transmitter.

FIG. 3 is a functional block diagram of an OFDM transmitter 300 that may be incorporated, for example in a base transceiver station or a terminal. The functional block diagram of the OFDM transmitter 300 includes the baseband section details the baseband portion of the transmitter and does not show signal processing, source interface, or RF sections that may be included in the transmitter 300.

The OFDM transmitter 300 includes one or more sources 302 that correspond to one or more data streams. When the OFDM transmitter 300 is a base station transmitter, the sources 302 may include data streams from an external network, such as a PSTN network. Each of the data streams may be intended for a separate terminal. The sources 302 can include voice and data streams when the OFDM transmitter is a terminal transmitter.

The data provided by the sources 302 can be multiple parallel data streams, serial data streams, multiplexed data streams, or a combination of data streams. The sources 302 provide the data to an encoder 304. The encoder 304 processes the data streams provided by the sources 302. The encoder 304 can include functional blocks that perform interleaving, encoding, and grouping, as is known in the art. The encoder 304 is not limited to performing a particular type of interleaving. For example, the encoder 304 can independently block interleave the source data for each terminal.

The transmitter 300 is not limited to a particular type of encoding. For example, the encoder 304 may perform Reed-Solomon encoding or convolutional encoding. The encoding rate may be fixed or may vary depending on the number of sub-carriers assigned to a communication link to the terminal. For example, the encoder 304 can perform convolutional encoding with a rate one half encoder when a first number of sub-carriers are assigned to a terminal and can be controlled to perform convolutional encoding with a rate of one third when a second number of sub-carriers are assigned to the terminal. In another example, the modulator can perform Reed-Solomon encoding with a rate that varies depending on the number of sub-carriers assigned to the terminal. The encoding rate can vary periodically or can be controlled by the sub-carrier assignment module 312. For example, the encoder 304 can be configured to perform block interleaving and the number of data bits in the block may correspond to a frame period. The encoding rate may be adjustable at each frame period boundary. Alternatively, the encoding rate may be adjusted at some other boundary.

Because the encoder rate may be adjusted relative to the number of sub-carriers allocated to a communication link, the encoder may be configured to provide $N_{max}$ different encoding rates, where $N_{max}$ represents a maximum number of sub-carriers that can be allocated to a communication link. The output of the encoder 304 is coupled to the modulator 310.

The modulator 310 can be configured to modulate the encoded data using a predetermined format. For example, the modulator 310 can perform Quadrature Amplitude Modulation (QAM), Quadrature Phase Shift Keying (QPSK), Binary Phase Shift Keying (BPSK), or some other modulation format. In another embodiment, the modulator 310 processes the data into a format for modulating the sub-carriers.

The modulator 310 can also include amplifiers or gain stages to adjust the amplitude of the data symbols assigned to the sub-carriers. The modulator 310 may adjust the gain of the amplifiers on a sub-carrier basis, with the gain to each sub-carrier dependent, at least in part, on the noise and interference in the sub-carrier bandwidth. The modulator 310 may also adjust the gain to each sub-carrier, in part, on a C/I or SINR value or power control signal communicated by a receiver.

The output of the modulator 310 is coupled to the input of a 1:N multiplexer 320, where N represents the maximum number of sub-carriers used in the transmit link of the communication system. The multiplexer 320 may also be referred to as a "serial to parallel converter" because the multiplexer 320 receives serial data from the modulator 310 and converts it to a parallel format to interface with the plurality of sub-carriers.

A sub-carrier assignment module 312 controls the encoder 304, modulator 310, and the multiplexer 320. The number of sub-carriers used to support the source data can be, and typically is, less than the maximum number of sub-carriers used in the transmit link of the communication system. The number of sub-carriers assigned to a particular communication link can change over time. A method of allocating the number of sub-carriers to a communication link is discussed below in relation to FIG. 7. Additionally, even if the number of sub-carriers assigned to a particular communication link remains the same, the identity of the sub-carriers can change over time.

Sub-carriers can be randomly, or pseudo-randomly, assigned to communication links. Because the identity of the sub-carriers can change, the frequency bands occupied by the communication link can change over time. The communication system can be a frequency hopping system implementing a predetermined frequency hopping method.

The sub-carrier assignment module 312 can implement the frequency hopping method and can track the set of sub-carriers used and the sets of sub-carriers allocated to communication links. For example, in a base station with three forward link signals, the sub-carrier assignment module 312 may assign a first set of sub-carriers to a first communication link, a second set of sub-carriers to a second communication link, and a third set of sub-carriers to a third communication link. The number of sub-carriers in each set may be the same of may be different. The sub-carrier assignment module 312 tracks the number of sub-carriers allocated to communication links and the number of sub-carriers that are idle and capable of assignment to communication links.

The sub-carrier assignment module 312 controls the modulator 310 to provide the desired encoding, and modulation required supporting the assigned sub-carrier set. Additionally, the sub-carrier assignment module 312 controls the multiplexer 320 such that data from the modulator 310 is provided to the multiplexer channel corresponding to an assigned sub-carrier. Thus, the sub-carrier assignment module 312 controls the identity of and number of sub-carriers assigned to a particular communication link. The sub-carrier assignment module 312 also tracks the identity of sub-carriers that are idle and that can be allocated to a communication link.

The output of the multiplexer 320 is coupled to an Inverse Fast Fourier Transform (IFFT) module 330. A parallel bus 322 having a width equal to or greater than the total number sub-carriers couples the parallel output from the multiplexer 320 to the IFFT module 330.

A Fourier transform performs a mapping from the time domain to the frequency domain. Thus, an inverse Fourier transform performs a mapping from the frequency domain to the time domain. The IFFT module 330 transforms the modulated sub-carriers into a time domain signal. Fourier transform properties ensure that the sub-carrier signals are evenly spaced and are orthogonal to one another.

The parallel output from the IFFT module 330 is coupled to a demultiplexer 340 using another parallel bus 332. The demultiplexer 340 converts the parallel modulated data stream into a serial stream. The output of the demultiplexer 340 may then be coupled to a guard band generator (not shown) and then to a Digital to Analog Converter (DAC) (not shown). The guard band generator inserts a period of time between successive OFDM symbols to minimize effects of inter-symbol interference due to multipath in the communication link. The output of the DAC may then be coupled to an RF transmitter (not shown) that upconverts the OFDM signal to a desired transmit frequency band.

Figure 4A:
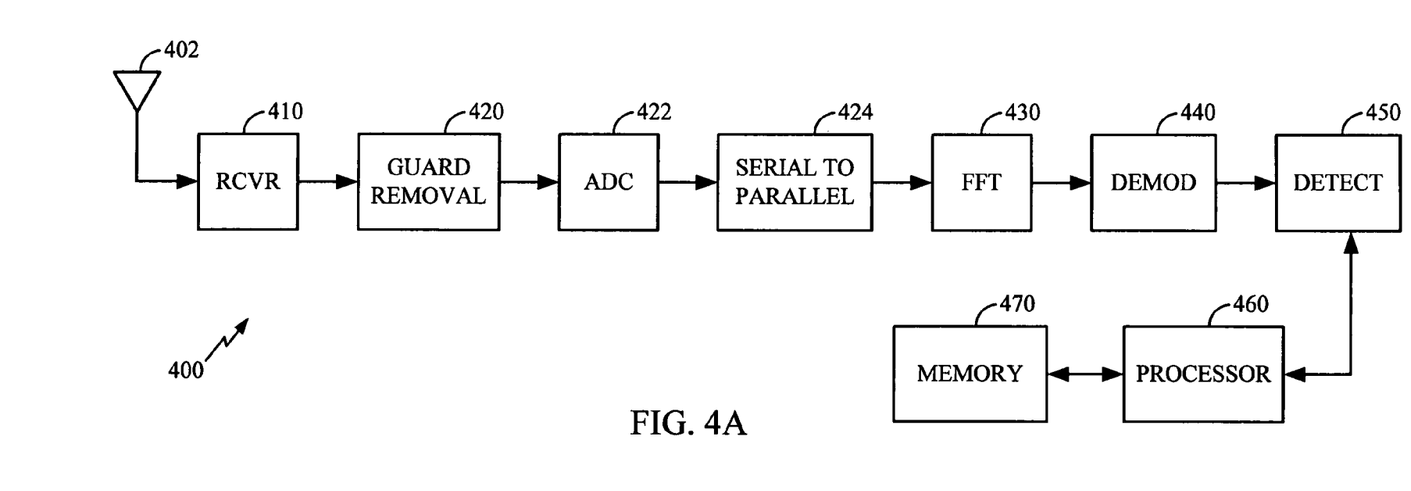
FIGS. 4A–4B are functional block diagrams of OFDM receivers.
Figure 4B:
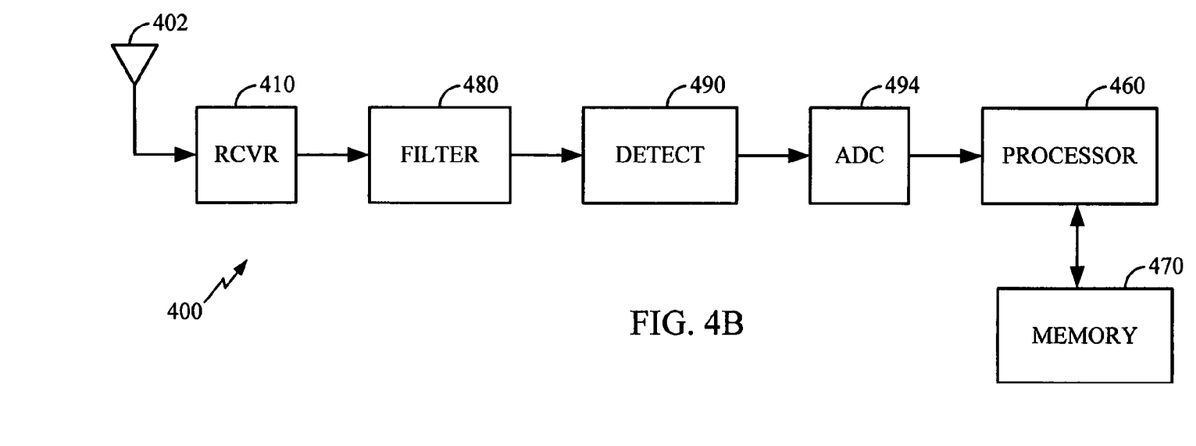

FIGS. 4A–4B are functional block diagrams of OFDM receiver 400 embodiments. The OFDM receiver 400 can be implemented in the base station or in a terminal, such as a mobile terminal. The OFDM receiver 400 of FIG. 4A implements a noise estimator primarily in the digital domain, while the OFDM receiver 400 of FIG. 4B implements a noise estimator primarily in the analog domain. The noise estimator is based in part on the detected signals and can be implemented in the processor 460 and memory 470.

The OFDM receiver 400 of FIG. 4A receives at an antenna 402 RF signals that are transmitted by a complementary OFDM transmitter. The output of the antenna 420 is coupled to a receiver 410 that can filter, amplify, and downconvert to baseband the received OFDM signal.

The baseband output from the receiver 410 is coupled to a guard removal module 420 that is configured to remove the guard interval inserted between OFDM symbols at the transmitter. The output of the guard removal module 420 is coupled to an Analog to Digital Converter (ADC) 422 that converts the analog baseband signal to a digital representation. The output of the ADC 422 is coupled to a multiplexer 424 that transforms the serial baseband signal into N parallel data paths. The number N represents the total number of OFDM sub-carriers. The symbols in each of the parallel data paths represent the gated time domain symbols of the OFDM signal.

The parallel data paths are coupled to an input of a Fast Fourier Transform (FFT) module 430. The FFT module 430 transforms the gated time domain signals into frequency domain signals. Each of the outputs from the FFT module 430 represents a modulated sub-carrier.

The parallel output from the FFT module 430 is coupled to a demodulator 440 that demodulates the OFDM sub-carriers. The demodulator 440 may be configured to demodulate only a subset of the sub-carriers received by the receiver 400 or may be configured to demodulate all of the outputs from the FFT module 430, corresponding to all of the sub-carriers. The demodulator 440 output can be a single symbol or can be a plurality of symbols. For example, if the sub-carrier is quadrature modulated, the demodulator 440 can output in-phase and quadrature signal components of the demodulated symbol.

The output of the demodulator 440 is coupled to a detector 450. The detector 450 is configured to detect the received power in each of the sub-carrier frequency bands. The detector 450 can detect the received power by detecting or other wise determining, for example, a power, an amplitude, a magnitude squared, a magnitude, and the like, or some other representation of the demodulated sub-carrier signal that correlates with received power. For example, a magnitude squared of a quadrature modulated signal can be determined by summing the squares of the in-phase and quadrature signal components. The detector 450 can include a plurality of detectors or can include a single detector that determines the detected value of desired sub-carrier signals prior to the occurrence of the next demodulated symbol.

A processor 460 interfaces with memory 470 that includes processor readable instructions. The memory 470 can also includes rewriteable storage locations that are used to store and update the detected sub-carrier noise values.

The sub-carriers allocated to a particular communication link may change at each symbol boundary. A frequency hopping sequence or frequency hopping information that identifies the sub-carriers allocated to the communication link to the receiver 400 can also be stored in memory 470.

The processor 460 uses the frequency hopping information to optimize performance of the FFT module 430, the demodulator 440, and the detector 450. Thus, the processor 460 is able to use the frequency hopping sequence, or other frequency hopping information, to identify which of the sub-carriers are allocated to a communication link and which of the sub-carriers are idle.

For example, where less than the total number of sub-carriers is allocated to the communication link to the receiver 400, the processor 460 can control the FFT module 430 to determine only those FFT output signals that correspond to the allocated sub-carriers. In another embodiment, the processor 460 controls the FFT module 430 to determine the output signals corresponding to the sub-carriers allocated to the communication link to the receiver 400 plus the outputs corresponding to sub-carriers that are idle and not allocated to any communication link. The processor 460 is able to relieve some of the load on the FFT module 430 by decreasing the number of FFT output signals it needs to determine.

The processor 460 may also control the demodulator 440 to only demodulate those signals for which the FFT module 430 provides an output signal. Additionally, the processor 460 may control the detector 450 to detect only those sub-carrier signals that correspond to idle, or unallocated sub-carriers. Because the detector 450 can be limited to detecting noise levels in unallocated sub-carriers, the detector 450 can be configured to detect the signals prior to the demodulator. However, placing the detector 450 after the demodulator 440 may be advantageous because the noise detected by the detector 450 will have experienced the same signal processing experienced by symbols in that sub-carrier. Thus, the statistical properties of the signal processing experienced by the demodulated noise will be similar to the statistical properties experienced by the demodulated symbols.

The processor 460 can track the noise in the sub-carriers by detecting the power of the demodulated noise in a sub-carrier whenever the sub-carrier is not assigned to a communication link. The detected power of the unassigned sub-carrier represents the power of interference plus noise in that sub-carrier band. The processor can store the detected power in a memory location in memory 470 corresponding to the sub-carrier. In a frequency hopping OFDM system, the identity of unassigned sub-carriers changes over time, and may change at each symbol boundary.

The processor 460 can store a number of detected power measurements for a first sub-carrier in independent memory locations. The processor 460 can then average a predetermined number of detected power measurements. Alternatively, the processor 460 can compute a weighted average of the noise and interference by weighting each of the stored detected power measurements by a factor that depends, in part, on the age of the detected power measurement. In still another embodiment, the processor 460 can store the detected noise and interference power in a corresponding location in memory 470. The processor 460 may then update the noise and interference value to produce a noise estimate for a particular sub-carrier by weighting the stored value by a first amount and weighting a new detected power by as second amount and storing the sum in the memory location corresponding to the sub-carrier. Using this alternative update method, only N storage locations are required to store the N sub-carrier noise and interference estimates. It may be seen that other methods of storing and updating the noise and interference values for the sub-carriers are available.

The detected power for an unassigned sub-carrier represents the aggregate noise and interference for that sub-carrier band unless no interfering sources are broadcasting in the frequency band. When no interfering sources are broadcasting in the sub-carrier frequency band, the detected power represents the detected power of the noise floor.

An OFDM system may guarantee that no system sources are broadcasting an interfering signal in a sub-carrier band by synchronizing all transmitters and defining a period during which all of the transmitters do not transmit over a particular sub-carrier. That is, where the noise estimator is performed in a receiver at the terminal, all base stations in an OFDM system may periodically stop transmitting on one or more predetermined sub-carrier frequencies during a predetermined symbol period. Communication in the OFDM system does not cease during the period in which the single sub-carrier is unassigned because all other sub-carriers may continue to be allocated to communication links. Thus, the level of noise without interference may be determined for each of the sub-carrier frequency bands by synchronizing the transmitters and periodically not assigning each of the sub-carriers to any communication link for one or more symbol periods. Then, the noise power with no interfering sources can be determined for the sub-carrier band during the period of non-assignment.

FIG. 4B is a functional block diagram of another embodiment of an OFDM receiver 400 in which the noise and interference are detected using analog devices. The receiver 400 initially receives OFDM signals at an antenna 402 and couples the output of the antenna 402 to a receiver 410. As in the previous embodiment, the receiver 410 filters, amplifies, and downconverts to baseband the received OFDM signal. The output of the receiver 410 is coupled to the input of a filter 480. The baseband output of the receiver 410 may also be coupled to other signal processing stages (not shown), such as a guard removal module, a FFT module, and a demodulator.

In one embodiment, the filter 480 is a filter bank having a number of baseband filters equal to a number of sub-carriers in the communication system. Each of the filters can be configured to have substantially the same bandwidth as the signal bandwidth of the sub-carrier. In another embodiment, the filter 480 is a filter bank having one or more tunable filters that can be tuned to any sub-carrier band in the communication system. The tunable filters are tuned to the sub-carrier frequency bands that are not allocated to the communication link to the receiver 400. The bandwidth of the tunable filters can be substantially the same as the bandwidth of the sub-carrier band.

The output from the filter 480 is coupled to the detector 490. The output from the filter 480 may be one or more filtered signals. The number of output signals from the filter 480 may be as high as the number of sub-carriers in the communication system.

The detector 490 can be configured to detect the power in each of the filtered signals. The detector 490 can include one or more power detectors. The power detectors can correspond to an output of the filter 480. Alternatively, one or more power detectors can be used to successively detect the power from each of the filter outputs.

The output of the detector 490 is coupled to the input of an ADC 494. The ADC 494 can include a plurality of converters, each corresponding to a one of the detector 490 outputs. Alternatively, the ADC 494 can include a single ADC that is sequentially converts each of the detector 490 outputs.

A processor 460 interfacing with a memory 470 can be coupled to the output of the ADC 494. The processor 460 can be configured, using processor readable instructions stored in memory 470, to control the ADC 494 to convert only those detected power levels of interest. Additionally, the processor 460 can track the frequency hopping sequence and update the detected noise and interference levels as in the previous embodiment. The noise level can be detected independent of the interference level in synchronous systems where all transmitters can be controlled to periodically cease transmitting on a predetermined sub-carrier for a predetermined duration, such as a symbol period.

Figure 5:
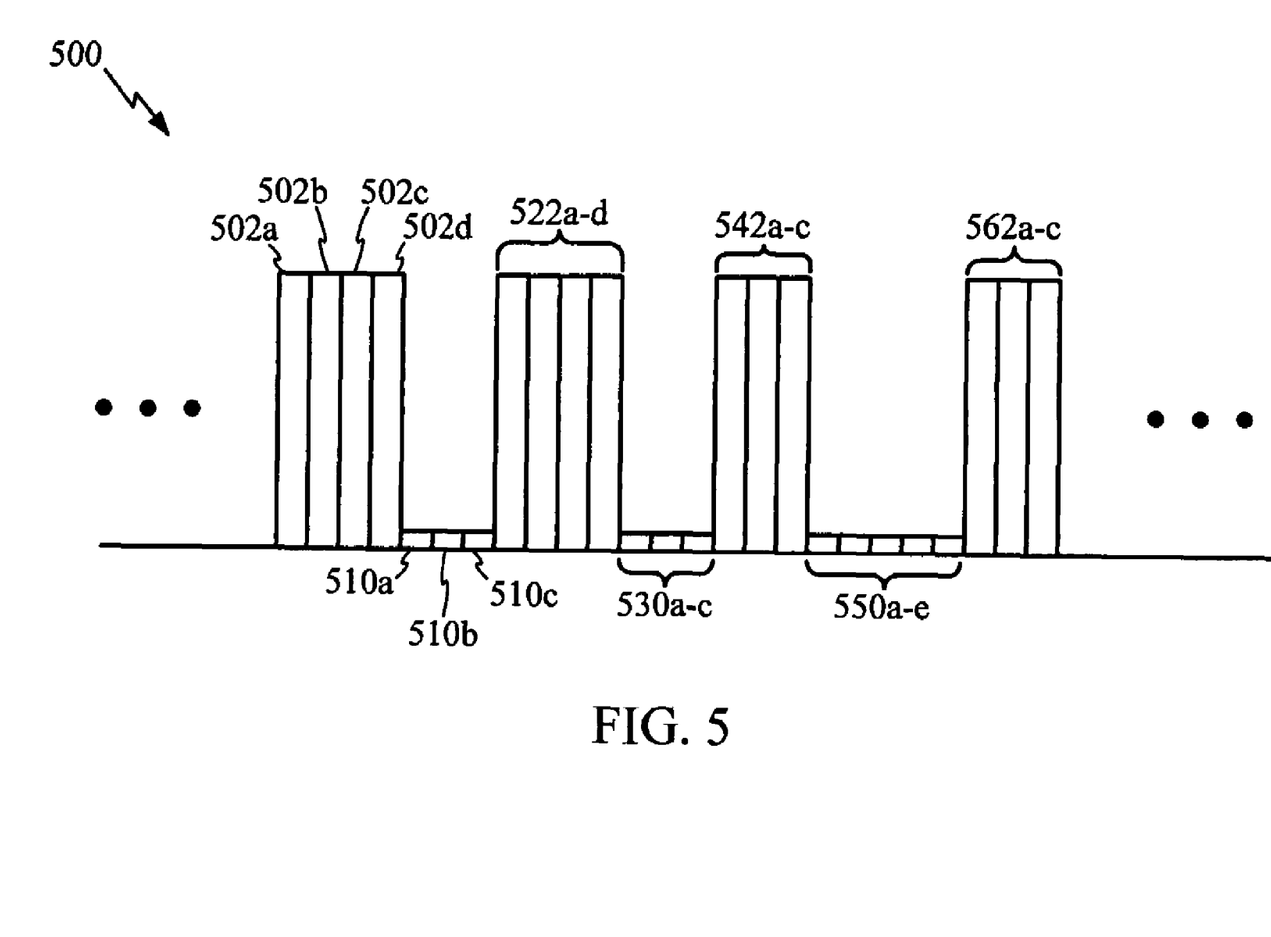
FIG. 5 is a spectrum diagram of a portion of an OFDM frequency band.

FIG. 5 is a spectrum diagram of a portion of an OFDM frequency band 500 during a predetermined period of time, such as during one symbol period or during one frame period. The OFDM frequency band 500 includes a number of sub-carriers that each occupy a predetermined frequency band, for example 502a. A plurality of communication links may simultaneously occupy the OFDM frequency band 500. The plurality of communication links may use only a subset of the total number of sub-carriers available in the system.

For example, a first communication link may be allocated four sub-carriers occupying four frequency bands, 502a–d. The sub-carriers and the corresponding frequency bands 502a–d are shown as positioned in one contiguous frequency band. However, the sub-carriers allocated to a particular communication link do not need to be adjacent and may be any of the available sub-carriers in the OFDM system. A second communication link may be allocated a second set of sub-carriers, and thus a second set of sub-carrier frequency bands 522a–d. Similarly a third and a fourth communication link may be allocated a third set and a fourth set, respectively, of sub-carriers. The third set of sub-carriers corresponds to a third set of frequency bands 542a–c and the fourth set of sub-carriers corresponds to a fourth set of sub-carrier frequency bands 562a–c.

The number of sub-carriers allocated to a particular communication link may vary with time and may vary according to the loads placed on the communication link. Thus, higher data rate communication links may be allocated a higher number of sub-carriers. The number of sub-carriers allocated to a communication link may change at each symbol boundary. Thus, the number and position of sub-carriers allocated in the OFDM system may change at each symbol boundary.

Because the total number of allocated sub-carriers may not correspond to the total number of sub-carriers available in the OFDM system, there may be one or more sub-carriers that are not allocated to any communication link, and thus are idle. For example, three sub-carrier bands, 510a–c, 530a–c, and 550a–e, are shown in the OFDM frequency band 500 as not allocated to any communication link. Again, the unassigned sub-carriers, and thus the corresponding sub-carrier bands, need not be adjacent and do not necessarily occur between allocated sub-carriers. For example, some or all of the unassigned sub-carriers may occur at one end of the frequency band.

A receiver can estimate, and update estimates of, the noise plus interference in a sub-carrier by detecting the power in the sub-carrier band when the sub-carrier is unassigned. An unassigned sub-carrier can represent a sub-carrier that is locally unassigned, such as in a cell or sector in which the receiver is positioned. Other cells or sectors of a cell may allocate the sub-carrier to a communication link.

For example, a first receiver, such as a receiver in a terminal may establish a communication link with a base station using a first set of sub-carriers in a first frequency band 502a–d. The first receiver can estimate the noise and interference in an unassigned frequency band, for example 530a, by determining the power in the sub-carrier frequency band 530a. As discussed earlier, the receiver may update an estimate previously stored in memory by averaging previously stored power levels with the most recently measured power level. Alternatively, the most recently determined power level, corresponding to the most recent noise and interference estimate, may be used in the determination of a weighted average of a predetermined number of recent noise plus interference estimates.

Additionally, in a synchronized system, one or more of the sub-carriers may be unassigned for all transmitters for a predetermined duration, for example one symbol duration. Thus, the sub-carrier is unassigned in all cells of a particular OFDM system for the symbol duration. Then for the system wide unassigned sub-carrier the receiver can estimate the noise floor by determining the power in the sub-carrier frequency band, for example 550d, during the period in which no transmitter is transmitting in the frequency band. The receiver may also update the noise estimates by averaging or weighted averaging a number of estimates. The receiver may separately store the estimate of the noise floor for each of the sub-carrier bands. Thus, the receiver is periodically able to update the noise floor and noise and interference levels in each of the sub-carrier bands.

Figure 6:
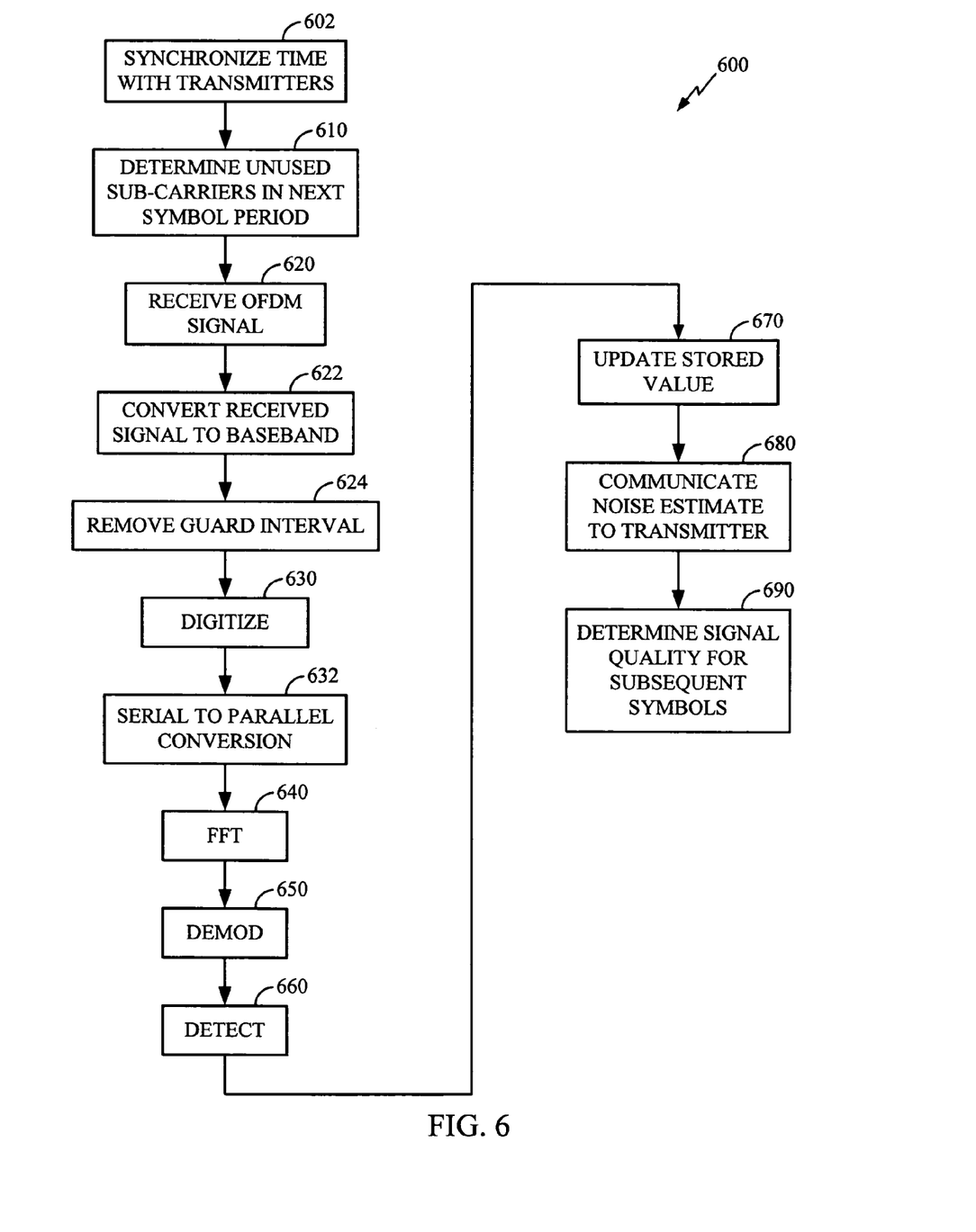
FIG. 6 is a flowchart of a method of determining noise and interference in an OFDM system.

FIG. 6 is a flowchart of a method 600 of determining and updating noise and interference levels in OFDM sub-carrier bands. The method 600 may be implemented in a receiver in an OFDM system. The receiver can be, for example, the receiver in a terminal. Alternatively, or additionally, the receiver can be, for example, a receiver in a base station transceiver.

The method 600 begins at block 602 where the receiver synchronizes in time with the transmitter. The receiver may, for example, synchronize a time reference with a time reference in the transmitter. The receiver may need to synchronize with the transmitter for a variety of reasons unrelated to noise estimation. For example, the receiver may need to synchronize with the transmitter in order to determine which sub-carriers are allocated to its communication link during one or more symbol periods.

The receiver next proceeds to block 610 where the receiver determines the unused, or unassigned, sub-carriers in the next symbol period. The transmitter may send this information to the receiver in an overhead message. Thus, a message received by the receiver indicates which of the sub-carriers are unassigned in a given symbol period. Alternatively, the assignment of sub-carriers may be pseudo random and the receiver may have synchronized a locally generated pseudo random sequence with the transmitter in the previous synchronization step. In the alternative embodiment, the receiver determines the unassigned sub-carriers based on an internally generated sequence, such as the locally generated pseudo random sequence or an internally generated frequency hopping sequence.

The receiver proceeds to block 620 where the transmitted OFDM signals are received. The received symbols may include those assigned sub-carriers allocated to the communication link with the receiver as well as sub-carriers not allocated to the communication link with the receiver.

The receiver proceeds to block 622 where the receiver converts the received signals to a baseband OFDM signal. The received signals are typically wirelessly transmitted to the receiver as RF OFDM symbols using an RF link. The receiver typically converts the received signal to a baseband signal to facilitate signal processing.

After converting the received signal to a baseband signal, the receiver proceeds to block 624 where the guard intervals are removed from the received signals. As discussed earlier in the discussion of the OFDM transmitter, the guard intervals are inserted to provide multipath immunity.

After removal of the guard intervals, the receiver proceeds to block 630 where the signal is digitized in an ADC. After digitizing the signal, the receiver proceeds to block 632 where the signal is converted from a serial signal to a number of parallel signals. The number of parallel signals may be as high as, and is typically equal to, the number of sub-carriers in the OFDM system.

After the serial to parallel conversion, the receiver proceeds to block 640 where the receiver performs an FFT on the parallel data. The FFT transforms the time domain OFDM signals into modulated sub-carriers in the frequency domain.

The receiver proceeds to block 650 where at least some of the modulated sub-carriers output from the FFT are demodulated. The receiver typically demodulates the sub-carriers allocated to the communication link with the receiver and also demodulates the unassigned sub-carriers.

The receiver then proceeds to block 660 where the unassigned sub-carriers are detected to provide a noise and interference estimate. If the sub-carrier is a system wide unassigned sub-carrier, the detected output represents an estimate of the noise floor for that sub-carrier band.

The receiver then proceeds to block 670 and updates the noise plus interference and noise floor estimates stored in memory. As discussed earlier, the receiver may store a predetermined number of most recently determined noise plus interference estimates and perform an average of the estimates. Similarly, the receiver may determine an average of a predetermined number of recently determined noise floor estimates.

The receiver proceeds to block 680 where the noise estimate is communicated to a transmitter. For example, if the receiver is a terminal receiver, the terminal receiver may communicate the noise estimate to a transmitter in a base station transceiver. The terminal receiver may first communicate the noise estimate to an associated terminal transmitter. The terminal transmitter may then transmit the noise estimate to the base station receiver. The base station receiver, in turn communicates the noise estimate to the base station transmitter. The base station transmitter may use the noise estimate to adjust the power level transmitted by the transmitter at the sub-carrier corresponding to the noise estimate.

The base station receiver may similarly communicate the received noise estimate to a terminal transmitter by first transmitting the noise estimate, using the base station transmitter, to the terminal receiver.

At block 690, the receiver determines a signal quality of subsequently received symbols based in part on the noise estimate determined using the unassigned sub-carrier. For example, the receiver estimates the noise plus interference of an unassigned sub-carrier. At the next symbol period, the receiver may receive a symbol over the same, previously unassigned, sub-carrier. The receiver is then able to determine a signal quality, such as C/I or SINR, based in part on the previously determined noise estimate. Similarly, where the receiver determines a noise floor estimate, the receiver is able to determine a SNR for subsequent symbols received on the same sub-carrier.

Because the number and position of unassigned sub-carriers typically vary randomly, or pseudo randomly, the receiver is able to periodically update the estimates of noise plus interference and noise floor for each of the sub-carrier frequency bands in the OFDM system. A receiver is thus able to generate and update estimates of noise plus interference and noise floor that can be communicated to transmitter stages as part of a closed power control loop. Additionally, a sub-carrier scheduling module can use the noise plus interference and noise floor estimates to determine sub-carrier allocation.

Figure 7:
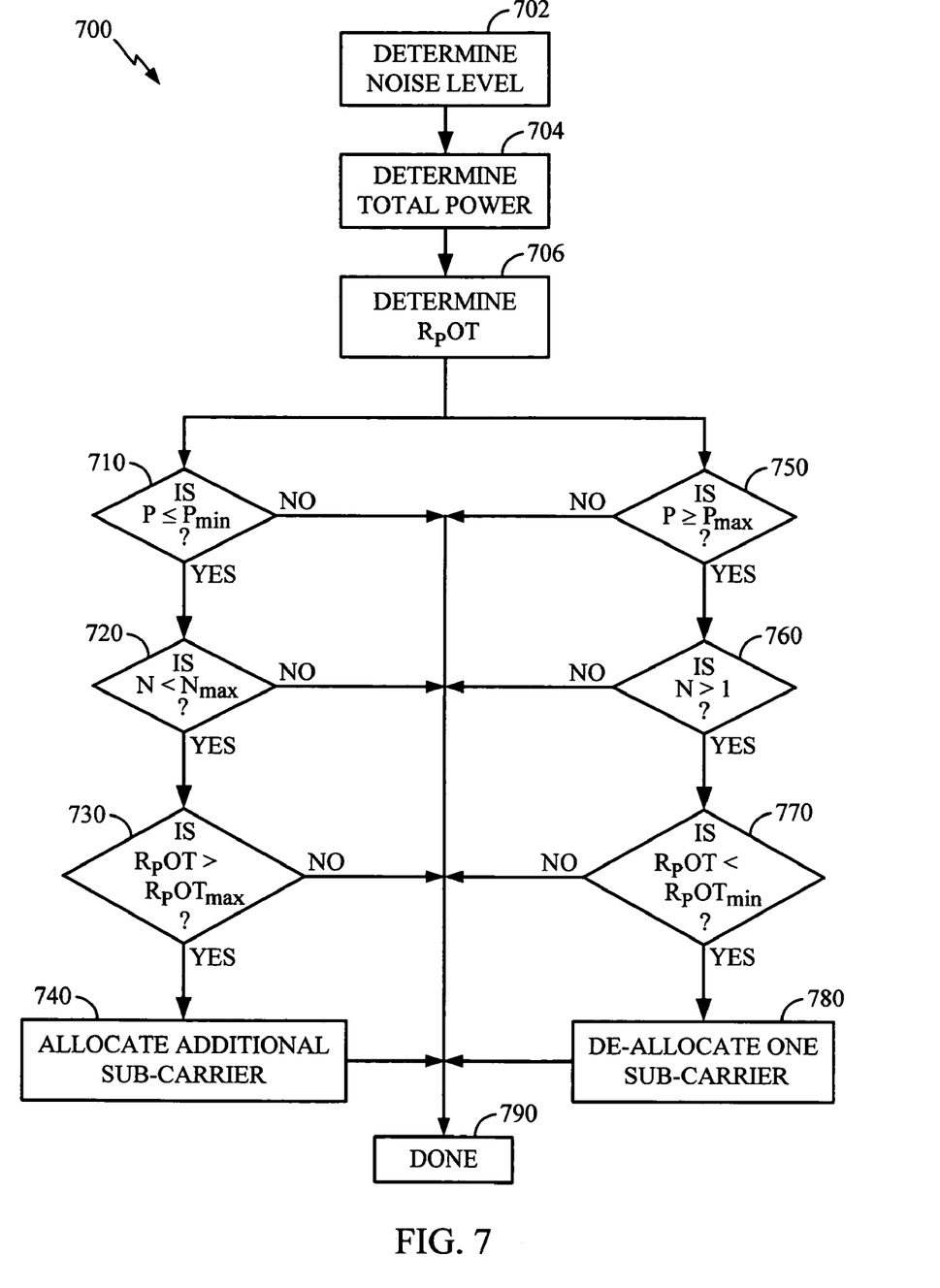
FIG. 7 is a flowchart of a method of scheduling sub-carriers in an OFDM system.

FIG. 7 is a flowchart of a sub-carrier scheduling method 700 that can be implemented in either a transmitter, such as 300 from FIG. 3, or a receiver, such as 400 from FIG. 4. The method 700 can also be used as part of a power control loop. In one embodiment, the method 700 is implemented in a base station receiver, such as 400d in FIG. 2. The base station receiver can determine the sub-carrier scheduling and communicate the sub-carrier allocation information to a terminal transmitter. The terminal transmitter can implement an updated sub-carrier allocation, for example, at the next frame boundary.

The method 700 begins at block 702 where the receiver determines a noise level. The noise level may be the noise plus interference estimate determined using the method of FIG. 6. Alternatively, the noise level can be the noise floor estimate determined using the method of FIG. 6 when the system is synchronous.

After determining the noise level 702, the receiver proceeds to block 704 and determines the total power level. The total power level can be determined using an estimate of total receive power. The total power level can be, for example, estimated using a detector that detects the received power in the sub-carriers allocated to the communication link. Alternatively, because the sub-carriers allocated to a communication link are not necessarily in a contiguous band, the total power level can be estimated using the receive power detected in each of the allocated sub-carriers. The power may be determined, for example, as a root mean square (RMS) of the individual sub-carrier powers or as a square root of the sum of the squares of the sub-carrier signal magnitudes. A power control loop may attempt to maintain the total power within a predetermined receive power range. Thus, if the total power reaches a predetermined maximum received power, $P_{max}$, the power control loop will not request that the transmitter increase the transmit power. Conversely, if the total power decreases to a minimum received power, $P_{min}$, the power control loop will not request that the transmitter further decrease the transmit power.

After determining the total power, alternatively referred to as a total received power, an aggregate received power, or a received power, the receiver proceeds to block 706. At block 706, the receiver determines a ratio of received power over noise, $R_POT$, for each allocated sub-carrier. If the receiver implements a detector that determines a power of each sub-carrier then $R_POT$ for that sub-carrier is the received power in the sub-carrier divided by the noise level in that sub-carrier. Alternatively, an average $R_POT$ value for the allocated sub-carriers can be determined as the total power divided by a total noise in all sub-carriers. The total noise may be determined as an RMS value of the individual sub-carrier noise estimates or as a square root of the sum of the squares of the sub-carrier noise estimate magnitudes. The $R_POT$ is typically determined in decibels (dB) and the power control loop attempts to maintain the $R_POT$ value within a predetermined range. For example, the predetermined range may be centered about a predetermined threshold, $R_POT_{TH}$, and vary above and below the predetermined threshold by a predetermined range, $\Delta$. Thus, the power control loop attempts to maintain $R_POT$ within the range of $R_POT_{min}$, ($R_POT-\Delta$) to $R_POT_{max}$, ($R_POT+\Delta$). The predetermined range, $\Delta$, can be, for example, 1 dB, 2 dB, 3 dB, 6 dB, 9 dB, 10 dB, 20 dB, or some other value.

Once the average $R_POT$ value or individual $R_POT$ values are determined, the receiver proceeds to decision blocks 710 and 750. Two independent branches, or paths, beginning at decision blocks 710 and 750, are depicted in the method 700 as occurring in parallel. However, the two independent paths may be performed in parallel or in series. If performed in series, there is no significant preference as to which of the independent paths is performed first. In some applications, there may be an advantage to performing one of the paths before the other.

The first branch of the method is used to determine if additional sub-carriers should be allocated to a communication link. One reason that additional sub-carriers may be added to a communication link is that although the received power is already at a minimum, the SNR in each sub-carrier exceeds a desired range. Thus, a lower sub-carrier power may be used without resulting in lower CCI or substantial degradation in quality of service.

Beginning at decision block 710, the receiver initially determines if the total power, P, is less than or equal to a predetermined minimum power, $P_{min}$. If not, the receiver proceeds to block 790 and the branch of the method 700 is done. However, if the total power, P, is less than or equal to the predetermined minimum power, the receiver proceeds to decision block 720.

At decision block 720, the receiver determines if the number of sub-carriers, N, currently allocated to the communication link is less than the maximum number of sub-carriers, $N_{max}$, that can be allocated to the communication link. The value of $N_{max}$ is typically less than or equal to a total number of sub-carriers available in the communication system. If N is not less than $N_{max}$; the receiver proceeds to block 790 and the branch of the method 700 is done. If N is less than $N_{max}$, the receiver proceeds to decision block 730.

In decision block 730, the receiver determines if $R_POT$ is greater than $R_POT_{max}$. If not, the receiver proceeds to block 790 and the branch of the method 700 is done. However, if $R_POT$ is greater than $R_POT_{max}$, the receiver proceeds to block 740.

In block 740, the receiver allocates an additional sub-carrier to the communication link. The receiver can allocate the sub-carrier by communicating the request to increment the number of sub-carriers in the communication link to a system controller. The system controller can then allocate the sub-carrier to the communication link. The base station transmitter can broadcast a message with the updated sub-carrier allocation to the terminal receiver. The terminal receiver recovers the updated sub-carrier allocation and uses it in the sub-carrier assignment module of the terminal transmitter. The terminal transmitter, in response to the updated sub-carrier allocation, may adjust the coding rate for the sub-carrier data. For example, the transmitter may maintain a constant symbol rate in each sub-carrier. Thus, when the number of allocated sub-carriers increases, the coding rate used for each sub-carrier decreases to maintain a constant symbol rate. A decreased coding rate, for example from rate one half to rate one third, corresponds to a stronger code and thus a larger coding gain.

The identity of the sub-carrier may be determined using a predetermined frequency hopping sequence or may be randomly or pseudo randomly determined. For example, it may be advantageous to allocate a sub-carrier that is not adjacent to any currently allocated sub-carriers to increase frequency diversity in the communication link. Increasing the number of sub-carriers allocated to a communication link may decrease the average power per sub-carrier and thus may decrease the interference experienced by other users. After allocating the additional sub-carrier, the receiver proceeds to block 790 and the branch of the method 700 is done.

A second branch of the method 700 is used to determine if fewer sub-carriers should be allocated to a communication link. A second branch of the method 700 begins at decision block 750. In decision block 750, the receiver determines if the total power P is greater than or equal to the predetermined maximum received power, $P_{max}$. If not, the receiver proceeds to block 790 and the branch of the method is done.

However, if P is greater than $P_{max}$, the receiver proceeds to decision block 760. In decision block 760, the receiver determines if the number of sub-carriers currently allocated to the communication link is greater than one. The number of currently allocated sub-carriers needs to be greater than one because the branch of the method 700 is determining whether or not to decrease the number of allocated sub-carriers. If the number of sub-carriers is not greater than one, decreasing the number of allocated sub-carriers would eliminate the communication link. Thus, if the number of currently allocated sub-carriers is not greater than one, the receiver proceeds to block 790 and the branch of the method 700 is done.

If the number of currently allocated sub-carriers is greater than one, the receiver proceeds to decision block 770. In decision block 770, the receiver determines if $R_POT$ is less than $R_POT_{min}$. If not, the SNR in each sub-carrier is within the desired range and thus, no change in sub-carrier allocation is desired. The receiver proceeds to block 790 if $R_POT$ is not less than $R_POT_{min}$. In block 790, the branch of the method 700 is done.

If, however, $R_POT$ is less than $R_POT_{min}$, the receiver proceeds to block 780. In block 780 the receiver de-allocates one sub-carrier from the communication link. That is, the number of sub-carriers allocated to the communication link is decreased by one. A decrease in the number of sub-carriers allocated to a communication link allows the power in each sub-carrier to increase without increasing the total power.

Again, the updated sub-carrier allocation is communicated to the transmitter. The transmitter may also increase the coding rate in response to the decrease in the number of sub-carriers allocated to the communication link. Thus, the transmitter continues to maintain a constant symbol rate on each sub-carrier.

Although the method 700 is described as a sub-carrier scheduling method, the method 700 is also useful as a power control method. The method 700 allocates an additional sub-carrier to a communication link when received power is at a minimum but $R_POT$ is greater than a predetermined maximum. The effect of allocating an additional sub-carrier to the communication link is to decrease the $R_POT$ without changing the total received power. The decrease in $R_POT$ results in decreased interference for other communication links using the same sub-carrier.

Conversely, the method de-allocates a sub-carrier from a communication link when received power is at a maximum and $R_POT$ is less than a predetermined minimum. The effect of decrementing the number of allocated sub-carriers is to raise $R_POT$ given the same received power.

Figure 8:
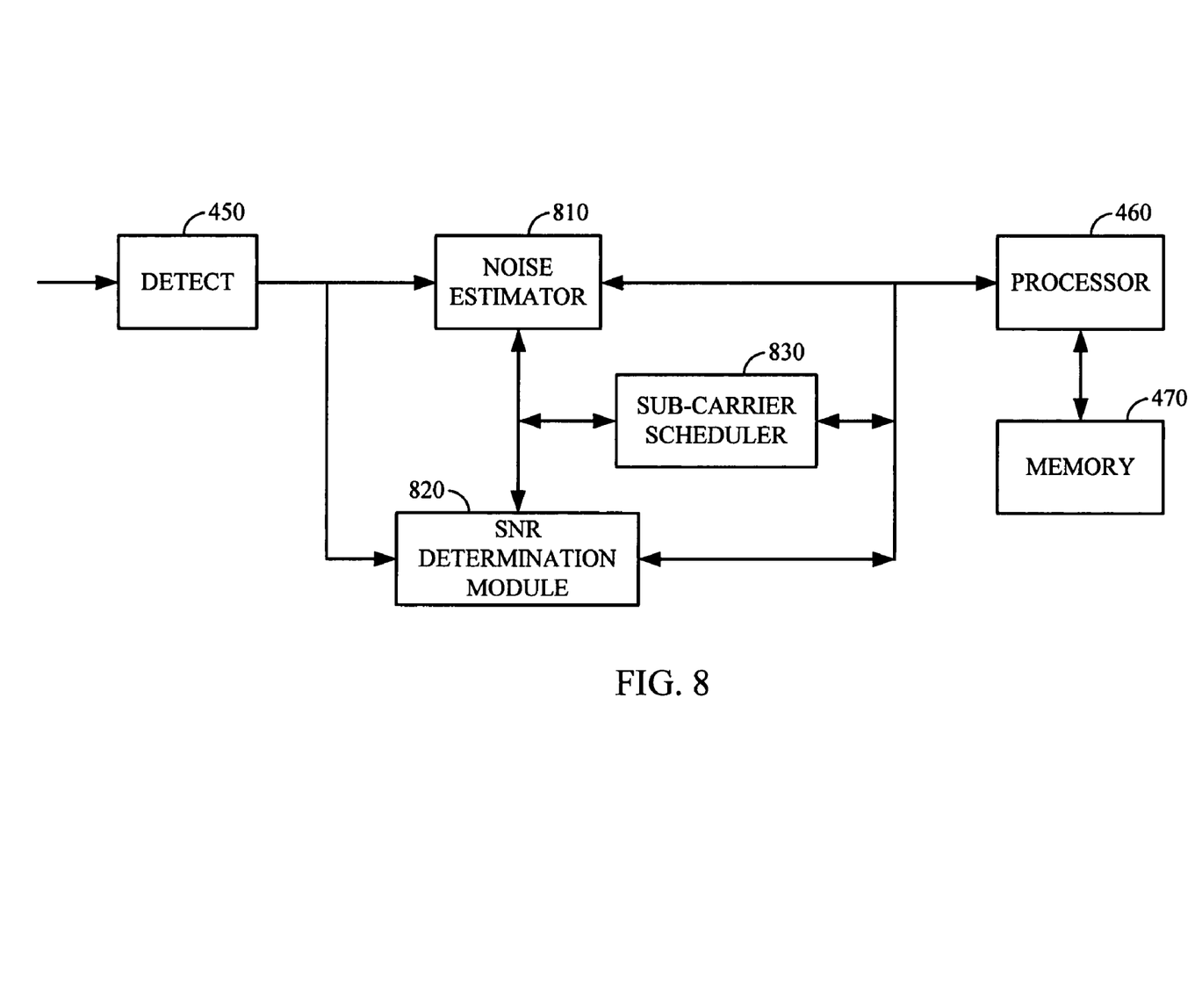
FIG. 8 is a functional block diagram of a power control and sub-carrier scheduling module.

FIG. 8 is a functional block diagram of a sub-carrier scheduler implemented as part of a receiver, such as the receiver 400 of FIG. 4A. In the embodiment shown in FIG. 8, the output of the detector 450 is coupled to a noise estimator 810. In the embodiment of FIG. 4A, the processor 460 and memory 470 perform the functions of the noise estimator 810.

The noise estimator 810 monitors the sub-carrier allocation and reads the detected power from the unassigned sub-carriers. The noise estimator 810 also performs any subsequent signal processing on the detector outputs. For example, the noise estimator 810 can store the detected values in memory 470 or a memory (not shown) dedicated to the noise estimator 810. The noise estimator 810 may store one or more noise estimates of noise plus interference and noise floor for each channel. Additionally, the noise estimator 810 may average multiple noise estimates to create an average noise estimate for the sub-carrier frequency band.

The output of the detector 450 is also coupled to a SNR determination module 820. The SNR determination module 820 is also coupled to the noise estimator 810. The SNR determination module 820 is configured to determine a SNR or SINR for the received signal. The SNR determination module 820 can obtain the signal power in each of the sub-carriers from the detector 450. Thus, the SNR determination module 820 can be configured to determine the total power of the received signal. The value of noise, whether noise floor or noise plus interference, may be obtained from the noise estimator 810.

The SNR determination module 820 can be configured to determine the desired ratio for each individual allocated sub-carrier as well as for the total received signal. The SNR determination module 820 thus can determine a $R_POT$ value for the allocated sub-carriers. In one embodiment, the SNR determination module 820 computes the $R_POT$ values based in part on the SNR. In another embodiment, the SNR determination module computes the $R_POT$ values based in part on the SINR.

A sub-carrier scheduler 830 is coupled to the noise estimator 810 and the SNR determination module 820. The sub-carrier scheduler 830 is able to use the noise, power, and $R_POT$ values obtained from the noise estimator 810 and SNR determination module 820 to determine if an additional sub-carrier should be assigned to the communication link, or if a sub-carrier should be de-allocated from the communication link.

A processor 460 and associated memory 470 are coupled to the noise estimator 810, SNR determination module 820, and sub-carrier scheduler 830. The processor 460 may be configured to perform some or all of the functions associated with the noise estimator 810, SNR determination module 820, and sub-carrier scheduler 830. Additionally, the processor 460 can be configured to communicate some or all of the values determined by the previous modules to subsequent modules. For example, the processor 460 may be configured to communicate an instruction to increment or decrement the number of sub-carriers to a local transmitter. The local transmitter may then communicate the message to a sub-carrier allocation module that is configured to track and allocate sub-carriers to particular communication links.

Where the receiver is a base station receiver, the instruction to increment or decrement a sub-carrier from a communication link can be communicated to a sub-carrier allocation module that uses a predetermined frequency hopping sequence to determine a new sub-carrier allocation for the terminal. The new sub-carrier allocation may then be communicated to the terminal. The terminal may then implement the new sub-carrier allocation at the next frequency hopping boundary.

Electrical connections, couplings, and connections have been described with respect to various devices or elements. The connections and couplings may be direct or indirect. A connection between a first and second device may be a direct connection or may be an indirect connection. An indirect connection may include interposed elements that may process the signals from the first device to the second device.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The above description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method of scheduling sub-carriers in an Orthogonal Frequency Division Multiplexing (OFDM) system, the method comprising:
   determining a signal to noise ratio for allocated sub-carriers; and
   determining a total received power at a receiver;
   determining a number of currently allocated sub-carriers; and
   adjusting a number of allocated sub-carriers based, at least in part, on the signal to noise ratio, the total received power and the number of currently allocated sub-carriers.

2. The method of claim 1, wherein determining the signal to noise ratio comprises:
   determining a received power in a sub-carrier frequency band;
   determining a noise estimate in the sub-carrier frequency band during at least one time period in which a sub-carrier corresponding to the sub-carrier frequency band is unassigned; and
   determining a ratio of the received power in the sub-carrier frequency band to the noise estimate.

3. The method of claim 2, wherein the noise estimate is determined during at least one time period in which the sub-carrier is locally unassigned.

4. The method of claim 2, wherein the noise estimate is determined during at least one time period in which the sub-carrier is system-wide unassigned.

5. The method of claim 1, wherein the signal to noise ratio comprises a signal to noise floor ratio.

6. The method of claim 1, wherein the signal to noise ratio comprises a signal to interference plus noise ratio.

7. The method of claim 1, wherein the signal to noise ratio comprises an average signal to noise ratio over all currently allocated sub-carrier frequency bands.

8. A method of scheduling sub-carriers in an Orthogonal Frequency Division Multiplexing (OFDM) system, the method comprising:
   determining a total received power;
   determining whether the total received power is less than or equal to a minimum total received power;
   determining a number of currently allocated sub-carriers;
   determining whether the number of currently allocated sub-carriers is less than a maximum number of sub-carriers in a link;
   determining whether a signal to noise ratio for the currently allocated sub-carriers is greater than a predetermined maximum signal to noise ratio; and
   incrementing the number of currently allocated sub-carriers if the total received power is less than the minimum total received power, the number of currently allocated sub-carriers is less than the maximum number of sub-carriers in the link, and the signal to noise ratio is greater than the predetermined maximum signal to noise ratio.

9. The method of claim 8, further comprising decrementing the number of currently allocated sub-carriers if to total received power is greater than a maximum total received power, the number of currently allocated sub-carriers is greater than one, and the signal to noise ratio is less than a predetermined minimum signal to noise ratio.

10. The method of claim 8, wherein the signal to noise ratio comprises a signal to noise floor ratio.

11. The method of claim 8, wherein the signal to noise ratio comprises a signal to interference plus noise ratio.

12. The method of claim 8, wherein the signal to noise ratio comprises an average signal to noise ratio over all currently allocated sub-carrier frequency bands.

13. A method of scheduling sub-carriers in an Orthogonal Frequency Division Multiplexing (OFDM) system, the method comprising:
   determining a total received power;
   determining whether the total received power is greater than or equal to a maximum total received power;
   determining a number of currently allocated sub-carriers;
   determining whether the number of currently allocated sub-carriers is greater than one;
   determining whether a signal to noise ratio for the currently allocated sub-carriers is less than a predetermined minimum signal to noise ratio; and
   decrementing the number of currently allocated sub-carriers if the total received power is greater than the maximum total received power, the number of currently allocated sub-carriers is greater than one, and the signal to noise ratio is less than the predetermined minimum signal to noise ratio.

14. The method of claim 13, further comprising incrementing the number of currently allocated sub-carriers if the total received power is greater than a minimum total received power, the number of currently allocated sub-carriers is less than a maximum number of sub-carriers in the link, and the signal to noise ratio is greater than a predetermined maximum signal to noise ratio.

15. The method of claim 13, wherein the signal to noise ratio comprises a signal to noise floor ratio.

16. The method of claim 13, wherein the signal to noise ratio comprises a signal to interference plus noise ratio.

17. The method of claim 13, wherein the signal to noise ratio comprises an average signal to noise ratio over all currently allocated sub-carrier frequency bands.

18. A method of scheduling sub-carriers in an Orthogonal Frequency Division Multiplexing (OFDM) system, the method comprising:
   determining a signal to noise ratio for allocated sub-carriers in a received OFDM signal;
   determining if the signal to noise ratio is within a predetermined range;
   determining a total received power at a receiver;
   determining a number of currently allocated sub-carriers; and
   scheduling a number of sub-carriers for a communication link from a terminal to a base station based, at least in part, on whether the signal to noise is within the predetermined range, the total received power and the number of currently allocated sub-carriers.

19. The method of claim 18, wherein scheduling the number of sub-carriers comprises incrementing the number of currently allocated sub-carriers if the total received power is less than a minimum total received power, the number of currently allocated sub-carriers is less than a maximum number of sub-carriers, and the signal to noise ratio is greater than a predetermined maximum signal to noise ratio.

20. The method of claim 18, wherein scheduling the number of sub-carriers comprises decrementing the number of currently allocated sub-carriers if the total received power is greater than a maximum total received power, the number of currently allocated sub-carriers is greater than one, and the signal to noise ratio is less than a predetermined minimum signal to noise ratio.

21. An apparatus for scheduling sub-carriers in an Orthogonal Frequency Division Multiplexing (OFDM) system, the apparatus comprising:

a noise estimator configured to estimate a noise level in a sub-carrier frequency band;

a signal to noise ratio determination module coupled to the noise estimator and configured to determine a signal to noise ratio in the sub-carrier frequency band and a total received power at a receiver; and a sub-carrier scheduler coupled to the signal to noise ratio determination module, the sub-carrier scheduler configured to schedule a number of sub-carriers based, at least in part, on whether the signal to noise is within a predetermined range and the total received power at the receiver.

22. The apparatus of claim 21, wherein the signal to noise determination module is configured to determine a signal to noise floor ratio.

23. The apparatus of claim 21, wherein the signal to noise determination module is configured to determine a signal to noise plus interference ratio.

24. An apparatus for scheduling sub-carriers in an Orthogonal Frequency Division Multiplexing (QFDM) system, the apparatus comprising:

a noise estimator configured to estimate a noise level in a sub-carrier frequency band;

a signal to noise ratio determination module coupled to the noise estimator and configured to determine a signal to noise ratio in the sub-carrier frequency band and a total received power at a receiver; and a sub-carrier scheduler coupled to the signal to noise ratio determination module, wherein the sub-carrier scheduler increments a number of sub-carriers if the total received power is less than a minimum total received power, a number of currently allocated sub-carriers is less than a maximum number of sub-carriers, and the signal to noise ratio is greater than a predetermined maximum signal to noise ratio.

25. The apparatus of claim 24, wherein the signal to noise determination module is configured to determine a signal to noise floor ratio.

26. The apparatus of claim 24, wherein the signal to noise determination module is configured to determine a signal to noise plus interference ratio.

27. An apparatus for scheduling sub-carriers in an Orthogonal Frequency Division Multiplexing (OFDM) system, the apparatus comprising:

a noise estimator configured to estimate a noise level in a sub-carrier frequency band;

a signal to noise ratio determination module coupled to the noise estimator and configured to determine a signal to noise ratio in the sub-carrier frequency band and a total received power at a receiver; and a sub-carrier scheduler coupled to the signal to noise ratio determination module, wherein the sub-carrier scheduler decrements a number of allocated sub-carriers if the total received power is greater than a maximum total received power, a number of currently allocated sub-carriers is greater than one, and the signal to noise ratio is less than a predetermined minimum signal to noise ratio.

28. The apparatus of claim 27, wherein the signal to noise determination module is configured to determine a signal to noise floor ratio.

29. The apparatus of claim 27, wherein the signal to noise determination module is configured to determine a signal to noise plus interference ratio.

30. An apparatus for scheduling sub-carriers in an Orthogonal Frequency Division Multiplexing (OEDM) system, the apparatus comprising:

a detector configured to determine a total received power; and a processor coupled with the detector and configured to determine a signal to noise ratio in a sub-carrier frequency band and to increment a number of sub-carriers if the total received power is less than a minimum total received power, a number of currently allocated sub-carriers is less than a maximum number of sub-carriers, and the signal to noise ratio is greater than a predetermined maximum signal to noise ratio.

31. The apparatus of claim 30, wherein the processor is configured to determine a signal to noise floor ratio.

32. The apparatus of claim 30, wherein the processor is configured to determine a signal to noise plus interference ratio.

33. The apparatus of claim 30, wherein the processor is further configured to decrement a number of allocated sub-carriers if the total received power is greater than a maximum total received power, the number of currently allocated sub-carriers is greater than one, and the signal to noise ratio is less than a predetermined minimum signal to noise ratio.

34. An apparatus for scheduling sub-carriers in an Orthogonal Frequency Division Multiplexing (OFDM) system, the apparatus comprising:

a detector configured to determine a total received power; and a processor coupled with the detector and configured to determine a signal to noise ratio in a sub-carrier frequency band and to decrement a number of allocated sub-carriers if the total received power is greater than a maximum total received power, a number of currently allocated sub-carriers is greater than one, and the signal to noise ratio is less than a predetermined minimum signal to noise ratio.

35. The apparatus of claim 34, wherein the processor is configured to determine a signal to noise floor ratio.

36. The apparatus of claim 34, wherein the processor is configured to determine a signal to noise plus interference ratio.

37. The apparatus of claim 34, wherein the processor is further configured to increment a number of sub-carriers if the total received power is less than a minimum total received power, the number of currently allocated sub-carriers is less than a maximum number of sub-carriers, and the signal to noise ratio is greater than a predetermined maximum signal to noise ratio.

* * * * *